US006706787B1

(12) United States Patent
Burris et al.

(10) Patent No.: US 6,706,787 B1
(45) Date of Patent: Mar. 16, 2004

(54) METHOD FOR PREPARING ASPHALT/POLYMER EMULSION-RUBBER PAVING COMPOSITION

(75) Inventors: Michael V. Burris, Carlsbad, CA (US); Bryan B. Burris, Carlsbad, CA (US)

(73) Assignee: Flex Products, Inc., Carlsbad, CA (US)

( * ) Notice: Subject to any disclaimer, the term of this patent is extended or adjusted under 35 U.S.C. 154(b) by 128 days.

(21) Appl. No.: 10/010,281

(22) Filed: Dec. 5, 2001

Related U.S. Application Data

(60) Provisional application No. 60/251,620, filed on Dec. 5, 2000.

(51) Int. Cl.⁷ .................................................. C08I 95/00
(52) U.S. Cl. .......................................... 524/60; 524/59
(58) Field of Search ............................... 524/59, 60, 61

(56) References Cited

U.S. PATENT DOCUMENTS

| | | | |
|---|---|---|---|
| 2,700,655 A | 1/1955 | Endres | 524/71 |
| 3,284,397 A | 11/1966 | Johnston | 524/60 |
| 3,891,585 A | 6/1975 | McDonald | 523/307 |
| 3,900,692 A | 8/1975 | Rostler | 428/489 |
| 3,919,148 A | 11/1975 | Winters et al. | 524/62 |
| 4,018,730 A | 4/1977 | McDonald | 524/60 |
| 4,021,393 A | 5/1977 | McDonald | 524/64 |
| 4,041,712 A | 8/1977 | Stepien, Jr. et al. | 61/36 |
| 4,068,023 A | 1/1978 | Nielsen et al. | 427/138 |
| 4,069,182 A | 1/1978 | McDonald | 524/59 |
| 4,073,659 A | 2/1978 | Burris | 106/277 |
| 4,137,204 A | 1/1979 | McDonald | 524/71 |
| 4,193,816 A | 3/1980 | Ferm et al. | 106/277 |
| 4,211,575 A | 7/1980 | Burris | 106/274 |
| 4,298,397 A | 11/1981 | Burris | 106/274 |
| 4,332,705 A | 6/1982 | Uffner | 523/206 |
| 4,492,781 A | 1/1985 | Duszak et al. | 524/59 |
| 4,548,962 A | 10/1985 | Lindmark | 523/220 |
| 4,564,310 A | 1/1986 | Thelen et al. | 404/31 |
| 4,609,696 A | 9/1986 | Wilkes | 524/59 |
| 4,621,108 A | 11/1986 | Burris | 523/340 |
| 5,151,456 A | 9/1992 | Elias et al. | 524/60 |
| 5,180,428 A | 1/1993 | Koleas | 106/277 |
| 5,436,285 A | 7/1995 | Causyn et al. | 524/68 |
| 5,488,080 A | 1/1996 | Osborn | 524/270 |
| 5,539,029 A | 7/1996 | Burris et al. | 524/60 |
| 5,604,277 A | 2/1997 | Osborn | 524/270 |
| 5,719,215 A | 2/1998 | Liang et al. | 524/62 |
| 5,811,477 A | 9/1998 | Burris et al. | 524/60 |
| 5,827,568 A | 10/1998 | Wickett | 427/136 |
| 5,925,695 A * | 7/1999 | Ohtsuka et al. | 524/68 |
| 5,936,015 A | 8/1999 | Burns | 524/71 |
| 5,959,007 A | 9/1999 | Liang | 524/62 |
| 5,990,207 A | 11/1999 | Perret et al. | 524/59 |
| 6,156,828 A | 12/2000 | Wickett | 524/60 |
| 6,194,519 B1 | 2/2001 | Blalock et al. | 525/232 |
| 2001/0004649 A1 | 6/2001 | Osborn | 524/270 |

FOREIGN PATENT DOCUMENTS

| | | | |
|---|---|---|---|
| EP | 0 866 837 B1 | 5/2000 | C08L/95/00 |
| SU | 85-241384/39 | 6/1978 | |

* cited by examiner

*Primary Examiner*—Peter Szekely
(74) *Attorney, Agent, or Firm*—Knobbe Martens Olson & Bear LLP

(57) ABSTRACT

A method of preparing an asphalt emulsion composition comprises preparing an aqueous emulsion of a synthetic polymer and asphalt mixture, and blending the aqueous asphalt/polymer emulsion with reclaimed rubber particles wherein the ratio of polymer:rubber particles is between about 1:2 and about 1:20, by weight, respectively, at ambient temperature. The final composition may also contain one or more solids selected from a rheological agent, gilsonite, carbon back, surface active clay and polymer fibers, and mixtures thereof.

14 Claims, No Drawings

METHOD FOR PREPARING ASPHALT/POLYMER EMULSION-RUBBER PAVING COMPOSITION

RELATED APPLICATIONS

This application claims priority to U.S. Provisional application serial No. 60/251,620, filed on Dec. 5, 2000.

BACKGROUND OF THE INVENTION

U.S. Pat. Nos. 5,539,029 and 5,811,477 disclose methods of preparing an asphalt emulsion-rubber paving composition comprising an aqueous asphalt emulsion, water, latex rubber and rubber particles. The rubber is mixed with other ingredients at ambient temperatures to form a homogenous liquid composition which is blended with aggregate at ambient temperatures to form a paving composition which provides a paving surface having improved skid resistance. The method and compositions described in the aforesaid patents are incorporated herein by reference. The methods described in the aforesaid patents result in improved paving compositions having very desirable properties including improved wet track abrasion and which are prepared without violating air pollution standards. The improved compositions incorporate polymer latex and reclaimed rubber particles in specific ratios. Although polymer latexes mix and perform well with a number of asphalts, when used with asphalts having a high acid number, some latex emulsions are unstable. Many latexes are mechanically unstable at any pH. Thus, the use of latexes in preparing compositions according to the aforesaid methods are problematic.

SUMMARY OF THE INVENTION

Asphalt emulsion compositions are prepared using polymer modified asphalt or a mixture of substantially water-free polymer and asphalt containing between about 1% and about 10% synthetic polymer by weight. An aqueous emulsion of the polymer/asphalt mixture is prepared and mixed at ambient temperature with rubber particles and/or particulate reclaimed rubber products in a ratio of synthetic polymer-:rubber particles of between about 1:2 and about 1:20, by weight. The resulting compositions may also include one or more of gilsonite, added sulfur, a thickener, a surface active clay, carbon black, graphite, and fiber products. A paving composition is prepared by blending the resulting aqueous asphalt emulsion composition with aggregate and/or recycled asphaltic concrete particles. In a preferred embodiment a solids mix composition, preferably in the form of an aqueous slurry of the aforesaid components, without the aqueous asphalt emulsion and aggregate, is separately prepared, and then blended with the aqueous asphalt emulsion and with aggregate at ambient temperature. In an alternative embodiment, an asphalt mix composition comprising the polymer/asphalt blend, rubber and one or more of the additions may be prepared, and the mixture emulsified and then blended with aggregate.

DETAILED DESCRIPTION OF THE PREFERRED EMBODIMENT

The aqueous asphalt emulsion compositions described herein comprise an asphalt/polymer composition emulsified in a water phase utilizing a suitable emulsifier which may be cationic, anionic or nonionic. A preferred emulsion utilizes a paving grade asphalt, also referred to in the art as an "aged residue" (AR) grade and as penetration grade asphalt. Commonly used asphalts of this type are AR-1000, AR-2000, AR-4000, AR-8000, and AR-16000, the numerical designations being the median asphalt viscosity at 140° F. (60° C.) in poises after aging. These penetration grade asphalts have a penetration above about 10 and up to about 300 dmm at 77° F. (25° C.), 100 g/5 sec. (ASTM D-5 or AASHO T-49). The specific asphalt penetration selected will depend on the type of emulsion which is to be produced as well as its ultimate use. For example, in producing a slurry emulsion or chip seal emulsion, asphalt penetrations are preferably about 50–70 dmm. Although penetration or paving (AR) grade asphalts may be preferred, especially where the ultimate use of the composition is for paving, liquid asphalts may be used for certain applications. The liquid asphalts comprise paving grade asphalts which have been cut back with naphtha, kerosene, gas oil, or other light hydrocarbon oils preferably with high maltene contents to produce rapid curing (RC), medium curing (MC), or slow curing (SC) liquid asphalts. Air blown or oxidized asphalts may also be used In the compositions described herein, a prepared or commercially available polymer modified asphalt or, asphalt/polymer composition prepared by mixing a synthetic polymer, which is substantially water-free, with asphalt is used. Preferred compositions incorporate between about 1% to bout 10% polymer by weight. A preferred synthetic polymer is a styrene-butadiene copolymer such as SBR or styrene-butadiene-styrene (SBS) block copolymers sold under the registered trademarks Kraton® or Hytrel®. The SBR may also be cross-linked, for example, with carboxylate groups resulting from treatment with methacrylic acid, or the like. Other useful polymers include neoprene, acrylic, vinylacrylic, acrylic terpolymers, nitrile, polyvinyl alcohol, polyvinyl acetate, vinyl acetate-ethylene, vinyl ester copolymers, ethylene vinyl chloride, polyvinylidene chloride, butyl, acrylonitrile-butadiene, polyurethanes, silicones, and block copolymers such as styrene-isoprene (SIS), styrene-ethylene-vinyl acetate (SEVAS) and styrene acrylate. Such polymers may be polymerized prior to mixing, or polymerized in the asphalt. For example, monomers and/or partically polymerized resins may be mixed with the asphalt and further polymerization and/or cross linking carried out in the asphalt mixture using suitable temperatures, pressure, catalyst, etc. For example, sulfur may be added to such mixtures and heated to achieve a suitable polymer/asphalt composition.

In preparing an asphalt/polymer composition, the two materials are preferably mixed at elevated temperatures sufficient to melt, solubilize, and/or polymerize or cross-link the materials. It has been found that by melting flakes, powder, or pieces of the polymer into the asphalt and blending the mixture, low temperature ductility of the final product is improved. Where the desired polymer is available in latex form, it may be useful to boil or flash off substantially all of the water from the latex and blend the synthetic polymer residue with the asphalt. Such a method is described in U.S. Pat. No. 4,621,108, the description of which is incorporated herein by reference.

The asphalt/polymer composition phase, optionally including gilsonite and/or sulfur as described hereinafter, is emulsified with water utilizing one or more anionic, cationic or nonionic emulsifiers. The preparation of aqueous asphalt emulsion is well understood by those skilled in the art. Typically, the asphalt solids phase of the aqueous asphalt emulsion is over about 50% by weight, preferably about 50% to about 75%, of the total asphalt emulsion, with the water phase making up the remainder of the emulsion, and containing between about 0.05% and about 10%, by weight, of the emulsifier. The ratio of the asphalt phase: water phase, is between about 1:2 and about 3:1, respectively, by weight, with the specific amount of water phase depending somewhat on the final use, or otherwise as desired.

Where the final compositions are to be used for paving anionic asphalt emulsion compositions may be preferred. Such compositions are also classified by the rate of setting of the emulsion, the rate at which the dispersed asphalt particles will recombine and form a continuous film of asphalt cement. SS (slow setting), MS (medium setting), or AQS (quick set) emulsions may be used. Useful anionic emulsifiers include petroleum sulfonates such as alphaolefin sulfonates or sulfates, soap-type emulsifying agents, typically the alkali metal salts of higher fatty acids such as lauric, myristic, palimitic, oleic, ricinoleic and linoleic acids, or mixtures of acids available from animal or vegetable oils. Other examples of anionic emulsifiers are described in U.S. Pat. No. 4,282,037, the description of which is incorporated herein by reference. A preferred SS-1h anionic emulsifier comprises a rosin acid soap, particularly a Vinsol® resin soap or other sulfonated lignin derivatives.

Alternatively, the asphalt emulsion may be a nonionic emulsified composition using emulsifiers including long chain polyoxyethylene or polyoxypropylene groups in fatty acid, alcohol, amide, or amine molecules. These emulsifiers do not ionize but acquire their hydrophilic characteristics from oxygenated side chains, i.e., polyoxyethylene or polyoxypropylene chains combined with the oil-soluble fatty acid, alcohol amine or amide component of the molecule. More specific descriptions of such emulsifiers are also disclosed in aforesaid U.S. Pat. No. 4,282,037, incorporated herein by reference.

The aqueous asphalt emulsions may alternatively be cationic emulsions commonly identified as CSS, CMS or CRS, again designating the rate of setting. Useful cationic emulsifiers include amines, quartary ammonium halides, alkyl-substituted imidazolines, and particularly those described in U.S. Pat. No. 4,298,397, the descriptions of which are incorporated herein by reference. The emulsifiers are typically used in concentrations of between about 0.05% and about 5%, by weight, of the aqueous asphalt emulsion.

The asphalt phase of the aqueous asphalt emulsion may also contain gilsonite. A preferred gilsonite is one having a melting or softening point near about 300° F. The gilsonite may be preferably blended with the asphalt/polymer composition prior to preparation of the aqueous asphalt emulsion. Where gilsonite is desired in the asphalt composition, it may be preferred to mix the gilsonite and synthetic polymer with the asphalt at elevated temperatures in the range at which both the polymer and gilsonite are melted or softened, e.g., up to about 300° F., plus or minus. One such process is described in U.S. Pat. No. 4,073,659, incorporated herein by reference, in which gilsonite is melted, the asphalt heated, and the two materials then blended at the gilsonite melting point temperature. Alternatively, gilsonite particles of a size range which can be easily physically mixed with the asphalt by stirring or similar agitation may be blended with the asphalt without the use of heat. Where the ultimate emulsion is to be used for paving, the preferred ratio of asphalt:gilsonite is between about 99:1 and about 5:95, by weight, respectively. However, the gilsonite may also, or alternatively be added as part of the solids mix composition that is blended with the aqueous asphalt emulsion and explained hereinafter.

Sulfur may also be used in preparing the aqueous asphalt emulsion. Sulfur may be blended with asphalt and a liquid hydrocarbon and the mixture emulsified to produce the aqueous asphalt emulsion as disclosed in U.S. Pat. Nos. 4,211,575 and 4,298,397, the descriptions of which are incorporated herein by reference. Pursuant to the methods disclosed in the aforesaid patents, the sulfur and asphalt or liquid asphalt, may be mixed at a high temperatures, above the melting point of sulfur, but below a critical temperature at which chemical reaction between the sulfur and asphalt occurs. The amount of sulfur added is between about 1% and about 10%, by weight, over the amount of any residual sulfur in said asphalt. The liquid hydrocarbons are petroleum hydrocarbons having a boiling point above about 200° F. and may be used in amounts of between about 1% and about 35%, by weight, of the asphalt phase.

The above-described aqueous asphalt emulsion is blended with rubber particles, used and/or virgin, and/or other particulate recycled or reclaimed rubber tire products. Rubber particles such as those obtained by grinding used rubber tires to relatively small particle sizes. Although any rubber particle sizes may be used, preferably at least a portion of the particles will pass through a #10, 20, 30 or 40 mesh U.S. series sieve, and even up to #200 mesh may be used. Such rubber particles are recovered from used tires by grinding, stripping or otherwise cutting away the old tread part of the tire from the sidewall shell or carcass, and grinding the rubber to a desired particle size, preferably passing a 20 mesh U.S. series sieve and more preferably passing a 40 mesh sieve. As an alternative or in addition to the aforesaid rubber particles, the rubber particles may be particulate solid reaction products obtained by processing reclaimed rubber, especially used rubber tires, to remove volatiles such as hydrocarbon gases, oils and further separating out metals and fibers. Known methods include catalyzed processes carried out at elevated temperatures, above 300° F., resulting in ash and carbon black particles. Known proprietary commercial processes utilize temperatures above about 400° F. to heat shredded tires in the presence of catalysts. Commercially obtained particles from such processing are small, typically about 50% of which pass a 50 mesh U.S. series sieve. Rubber particles may also be obtained from reclaimed rubber by other well known methods, such as described in *Introduction to Rubber Technology,* Reinhold Publishing Corp., 1959. The rubber particles may be mixed directly with the polymer/asphalt emulsion, or may be added as a component of a "solids mix" composition as will be described hereinafter. In preparing a rubber particle containing mixture or emulsion, it is important to avoid high temperatures as previously described. If heating is unnecessary, it is preferably avoided. Thus, mixing of the rubber at ambient temperatures, for example, above about 35° F., and preferably between about 60° and about 110° F. and more preferably between about 60° and about 85° F. or 95° F. Even when heat is used, aqueous emulsion temperatures are to be below the composition boiling point.

An important aspect of the asphalt emulsion composition of the invention is the ratio of synthetic polymer:rubber particles. The polymer:rubber particle ratio is between about 1:2 and about 1:20, and preferably between about 1:2 and about 1:10, and more preferably about 1:3 to about 1:10, by weight, respectively.

The asphalt emulsion composition also preferably contains a rheological agent. Rheological agents, which may sometimes be referred to as thickeners or thixotropic agents, include the associative thickeners such as urethanes and nonionic surfactants, alkali swellable latex thickeners such as SBR and acrylic latexes, natural and modified natural thickeners including modified cellulose products, vegetable and seaweed gums, and starch products. Other rheological agents are the clays, hydrated lime, Portland cement, alkyl amines, polyacrylic resins, carboxyvinyl resins, polyethylene maleic anhydrides, polysaccharides, and the like. The use of Portland cement and/or hydrated lime as rheological agents is limited depending on the emulsifiers present in the emulsion. These agents act as a "set initiator" when used with a number of anionic emulsifiers, primarily the alpha-olefin sulfonates, as described in U.S. Pat. No. 4,193,816, and with most cationic emulsifiers. Thus, Portland cement and/or hydrated lime are used as thickeners in the compositions of the invention only with slow set emulsifiers as will be understood by those skilled in the art.

All or a portion of the rheological agent to be used in the final asphalt emulsion composition may be added and mixed separately with the asphalt emulsion, or added as a component of the solids mix composition and/or added when blending aggregate at the time of preparing a paving or construction composition. The amount rheological/thickening agent used in the solids mix will depend on the amount of water present, the type and ratio of solids present, and the selected viscosity range and physical consistency of the solids mix composition desired. Typically between about 1% and about 20%, by weight, is suitable.

In addition to the aforesaid rheological agents, the asphalt emulsion composition also preferably includes a surface active clay. Preferred clays comprise bentonite, especially sodium bentonite or sodium montmorillonite. Other clays having surface active properties may also be used, for example, hydrated aluminum silicate clays, kaolin, kaolinite, halloysite, and pyrophyllite and the hydrated magnesium silicate clays such as serpentine, chrysotile, asbestos and talc, and hydrated aluminum-magnesium silicates such as attapulgite and fuller's earth. The clay may be added and mixed separately with the asphalt emulsion, or it may be a component of a solids mix composition which is blended with the asphalt emulsion. Preferably, between about 0.5% and about 5% of the final emulsion, or up to about 10% of the solids mix composition, by weight, comprises a clay.

Another optional ingredient of the final asphalt composition is polymer fibers. Useful polymer fibers comprise natural, synthetic or semisynthetic fibers. Natural fibers include polysaccharides such as starch, cellulose, pectin, seaweed and vegetable gums. Synthetic fibers are both thermoplastic and thermosetting synthetic resins. Thermoplastic polymers include nylon, PVC, polyethylene, polystyrene, polypropylene, fluorocarbons, polyurethane and acrylic resins (acrylates). Thermosetting resins include cross-linked polyethylene, phenolics, alkyd and polyester resins. The semisynthetic polymer resin fibers are cellulosics including rayon, methylcellulose, cellulose acetate and modified starches. Any polymer fibers of the aforesaid type may be used. Preferred fibers are semisynthetic polymer fibers obtained from recycled materials such as used newsprint or other paper, cardboard, processed wood or similar processed cellulosic fiber materials. Useful fibers may be obtained from other recycle sources including ground up rubber tires which include tire carcass fibers such as nylon, polyester and rayon fibers. Again, the polymer fibers may be mixed separately with the asphalt emulsion composition or added as a portion of the solids mix. The fibers may be added in amounts of between about 0.1% and about 10%, by weight.

Carbon black and/or graphite fibers may be added to the solids mix composition. Such material is conveniently added as a 50% aqueous solid dispersion of carbon black and used in an amount of between about 0.1% and about 10% by weight of said solids mix, or between about 0.1% and about 5%, by weight of the final liquid emulsion composition. Alternatively, the carbon black may be added separately when blending the solids mix and aqueous asphalt emulsion. Gilsonite may also be added as a component of the solids mix, in addition to, or instead of being added with the aqueous asphalt emulsion as previously described.

Where it is to be used, a solids mix composition to be added to and blended with the aqueous asphalt emulsion may be conveniently premixed, in part or in full, and held as an admix material until such time as it is to be blended with the aqueous asphalt emulsion. Because of the physical nature of the solids mix composition, it can be stored in bulk, either dry or as a slurry or dispersion, without concern of deterioration. Preferably, the solids mix composition contains enough water to form a slurry which is easily handled and packaged for shipping as well conveniently divided or apportioned by weight or volume in desired quantities or portions for blending with the aqueous asphalt emulsion at or near the time the emulsion composition is to be used. Water is desired to achieve a flowable, workable composition that can be conveniently handled and measured or metered and blended with the aqueous asphalt emulsion. Amounts of water between about 15% and about 75% by weight, achieve such a composition, typically in the form of a paste or slurry. A rheological or thixotropic agent is also preferably added as part of the solids mix composition to maintain the desired consistency and prevent solid particles from settling out in the mix. It may also be desirable to add a small amount of surfactant compatible with the emulsifier used in preparing the emulsion, and as a dispersant for the clay. Specific surfactants and amounts are well know to those skilled in the art. The amount of solids mix composition added and blended with the aqueous asphalt emulsion to prepare an asphalt emulsion composition of the invention is between 1% and 99% by weight of the emulsion composition, preferably less than about 50%, and more preferably less than about 35%, by weight, of the final emulsion composition. However, the specific amount used will be depend on the specific solids mix ingredients used in preparing the product as well as the intended or desired use of the composition, for example, paving, roofing, carpet backing or binding, coating, waterproofing, etc.

Although a rheological or thickening agent is preferably present in the solids mix, additional amounts may be desired or necessary in blending the final emulsion composition. It will be understood that where the composition is to be used for paving, construction, or the like which requires the blending of aggregate with the asphalt emulsion, the viscosity change due to the presence of substantial amounts of aggregate are to be taken into consideration. However, preferably the viscosity of the asphalt emulsion composition, without the presence of aggregate, will be at least about 1,500 and preferably up to about 20,000 centipoise (cp) at ambient temperature. The amount of thickener used is typically between about 0.2 and about 2%, by weight, of the liquid emulsion composition. The thickener used may be any of the previously described rheological or thixotropic agents.

In mixing and blending the components of the final asphalt emulsion composition, a number of different combinations of materials and steps may be utilized within the purview of the invention. For example, the aforesaid ingredients may be all combined and mixed together at the same time to form the final asphalt emulsion composition. However, a solids mix composition in the form of an aqueous slurry is preferably mixed with the aqueous asphalt emulsion at the time and/or near the site where the asphalt emulsion composition is to be used. The components of the final asphalt emulsion composition are mixed in any suitable way in order to obtain the desired homogeneity, but preferably using a blender, such as a ribbon blender or the like, which gives sufficient agitation and yet full blending of the different components. The amount of water present in the final composition may be minor or major, depending on the use. Typically, the amount of water is at least about 20%, up to about 50%, by weight. However, where necessary or desirable, greater or lesser amounts may be used. Preferably between about 1% and about 30% additional water, i.e., in excess of water present in the aqueous asphalt emulsion, is usually used in blending the final asphalt emulsion composition. The specific amount of water used can be adjusted to achieve the desired consistency, and preferably with the thickener provides the preferred viscosity of at least about 1,500 cp and up to about 20,000 cp at 65°–75° F., with the aforesaid amount of aqueous asphalt emulsion present. Additional emulsifier may be added, if necessary to maintain stabilization of the composition. However, where sufficient thickener is used to achieve desired viscosity of the composition the solids will remain substantially suspended whereby the consistency and homogeneity of the composition is stabilized without requiring added emulsifiers.

The final asphalt emulsion composition preferably contains between about 50%–80% by weight aqueous asphalt emulsion and, includes the synthetic polymer, between about 5% and about 45% rubber or solids mix composition containing the rubber, and water. Again, the solids mix composition contains rubber and one or more of the aforesaid other ingredients. If the asphalt emulsion composition of the invention is to be used as a paving material or for certain construction uses, aggregate is added and mixed to obtain the final composition. The aggregate may be any suitable aggregate including crushed rock, recycled glass, sand, graded silica, and the like, commonly used for such applications. The particle size of the aggregate is preferably ⅜ minus, i.e., will pass through a ⅜ inch mesh sieve, although for certain applications, larger particles may be used. However, preferably, to obtain the desired consistency, the aggregate materials should be no larger than about ½ inch mesh. The amount of aggregate used in a paving composition is preferably between about 5 and about 35 pounds and more preferably between about 10 and 30 pounds per gallon of the liquid composition. The viscosity of the composition changes when aggregate is added. Suitable paving composition viscosities are between about 5,000 and 50,000 and typically between 8,000 to 30,000 cp at ambient temperatures, for example, 65°–75° F., depending on gradation of aggregate used. A portion of the aggregate added may comprise used asphalt, asphalt which is recycled and typically obtained from recycled asphaltic pavement (RAP), also known as recycled asphaltic concrete. The RAP particles to be used may be of any desirable selected size range within the aforesaid aggregate particle sizes. The aggregate is conveniently mixed with the aqueous asphalt emulsion and solids mix composition at the aforesaid ambient temperatures, preferably above about 40° F. and more preferably between about 60° and about 100° F.

The following is an example of a composition as described herein, with % given by weight:

a paving grade asphalt containing 3% styrene-butadiene-styrene (SBS) block copolymer is emulsified using an SS-1h anionic emulsifier to form an aqueous asphalt emulsion having 63% total solids. A solid mix composition of water, 8.4% bentonite clay, 22.4% ground rubber tires (#20 mesh, U.S. Series) and 0.3% aminomethyl propanol added as a dispersant is blended with the aqueous asphalt emulsion in a 30%/70% ratio, respectively, at ambient temperature to form an asphalt emulsion composition. A paving composition is prepared by mixing the asphalt emulsion composition with suitable aggregate.

What is claimed is:

1. A method of preparing an asphalt emulsion composition comprising providing an asphalt/polymer composition, said asphalt/polymer composition comprising an asphalt and a substantially water-free polymer, emulsifying said asphalt/polymer composition with water to form an aqueous emulsion comprising a mixture of said asphalt and between about 1% and about 10% of said polymer, by weight, and mixing said aqueous emulsion with rubber particles, at least a portion of which pass a #10 U.S. series sieve, in a polymer:rubber particles ratio of between about 1:2 and about 1:20, by weight, at ambient temperature to form said asphalt emulsion composition.

2. The method of claim 1 comprising mixing a rheological agent with said aqueous emulsion and said rubber particles to prepare said asphalt emulsion composition.

3. A method of preparing an asphalt emulsion paving composition comprising mixing aggregate with the asphalt emulsion composition prepared according to claim 1.

4. A method of preparing an asphalt emulsion paving composition comprising mixing aggregate with the asphalt emulsion composition prepared according to claim 2.

5. The method of claim 1, wherein said asphalt/polymer composition is prepared by melting said polymer in said asphalt.

6. The method of claim 1 wherein said asphalt/polymer composition is prepared by polymerizing at least a portion of said polymer in said asphalt.

7. The method of claim 4 wherein said aggregate is mixed with said asphalt emulsion composition at ambient temperature.

8. The method of claim 7 wherein said asphalt/polymer composition is prepared by melting said polymer in said asphalt.

9. The method of claim 1, wherein the polymer:rubber particles ratio is between about 1:2 and about 1:10, by weight.

10. A composition prepared according to claim 1.

11. A paving composition prepare according to claim 7 wherein the polymer:rubber particles ratio is between about 1:3 and about 1:10, by weight.

12. The paving composition of claim 11 wherein at least a portion of said rubber particles pass a #20 U.S. series sieve.

13. The composition of claim 10 wherein said polymer is a styrene-butadiene copolymer.

14. The method of claim 1 further comprising mixing said aqueous emulsion with a solids mix composition comprising said rubber particles and one or more additives selected from the group consisting of rheological agent, gilsonite, surface active clay, carbon black, graphite, water and polymer fibers at ambient temperature to form said asphalt emulsion composition.

* * * * *